(12) United States Patent  (10) Patent No.: US 8,564,596 B2
Carrino et al.  (45) Date of Patent: Oct. 22, 2013

(54) TECHNIQUES FOR DENSITY MAPPING

(75) Inventors: John Antonio Carrino, Palo Alto, CA (US); Daniel Patrick Cervelli, Menlo Park, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 846 days.

(21) Appl. No.: 12/686,232

(22) Filed: Jan. 12, 2010

(65) Prior Publication Data

US 2011/0170799 A1 Jul. 14, 2011

(51) Int. Cl.
*G06T 15/10* (2011.01)

(52) U.S. Cl.
USPC .......................................... 345/427; 345/423

(58) Field of Classification Search
USPC ..................... 345/427, 423; 382/285; 701/200
See application file for complete search history.

(56) References Cited

U.S. PATENT DOCUMENTS

| | | | |
|---|---|---|---|
| 4,899,161 A | 2/1990 | Morin et al. | |
| 4,958,305 A | 9/1990 | Piazza | |
| 5,781,195 A | 7/1998 | Marvin | |
| 5,781,704 A * | 7/1998 | Rossmo .......................... | 706/45 |
| 6,157,747 A | 12/2000 | Szeliski et al. | |
| 6,389,289 B1 | 5/2002 | Voce et al. | |
| 6,529,900 B1 | 3/2003 | Patterson et al. | |
| 6,757,445 B1 * | 6/2004 | Knopp .......................... | 382/285 |
| 7,375,732 B2 | 5/2008 | Arcas | |
| 7,519,470 B2 | 4/2009 | Brasche et al. | |
| 7,529,195 B2 | 5/2009 | Gorman | |
| 7,558,677 B2 | 7/2009 | Jones | |
| 7,663,621 B1 | 2/2010 | Allen et al. | |
| 7,791,616 B2 * | 9/2010 | Ioup et al. ..................... | 345/606 |
| 7,872,647 B2 | 1/2011 | Mayer et al. | |
| 2003/0052896 A1 * | 3/2003 | Higgins et al. ................ | 345/619 |
| 2004/0030492 A1 * | 2/2004 | Fox et al. ...................... | 701/208 |
| 2004/0039498 A1 | 2/2004 | Ollis et al. | |
| 2004/0098236 A1 * | 5/2004 | Mayer et al. ................... | 703/2 |
| 2005/0031197 A1 * | 2/2005 | Knopp .......................... | 382/154 |

(Continued)

FOREIGN PATENT DOCUMENTS

EP 0 763 201 A2 3/1997
WO WO 2005/013200 A1 2/2005

OTHER PUBLICATIONS

Levine, N. (2006). "Crime Mapping and the CrimeStat Program", Geographical Analysis, vol. 38, Issue 1, Jan. 2006, pp. 41-56.*

(Continued)

*Primary Examiner* — Maurice L McDowell, Jr.
(74) *Attorney, Agent, or Firm* — Hickman Palermo Truong Becker Bingham Wong LLP

(57) ABSTRACT

Techniques in a data processor for drawing a density surface on a map in a manner that more accurately accounts for projection distortion in the map. According to one embodiment, data is maintained that represents a geotagged event. A map plane is divided into a plurality of cells and an origin cell corresponding to the geotagged event is identified. Density values are allocated to cells surrounding the origin cell based on geodetic distances between geographic coordinates corresponding to surrounding cells and the geographic coordinate of the geotagged event. A density surface based on the cell allocations is then displayed on a map. By allocating density values to cells based on geodetic distances, the resulting density surface displayed on the map more accurately accounts for projection distortions in the area of the map on which density surface is displayed.

29 Claims, 6 Drawing Sheets
(1 of 6 Drawing Sheet(s) Filed in Color)

(56) References Cited

U.S. PATENT DOCUMENTS

| | | |
|---|---|---|
| 2005/0034062 A1* | 2/2005 | Bufkin et al. ............... 715/512 |
| 2005/0182502 A1* | 8/2005 | Iyengar .......................... 700/90 |
| 2005/0182793 A1* | 8/2005 | Keenan et al. ............ 707/104.1 |
| 2006/0251307 A1 | 11/2006 | Florin et al. |
| 2007/0024620 A1 | 2/2007 | Muller-Fischer et al. |
| 2007/0188516 A1 | 8/2007 | Ioup et al. |
| 2008/0192053 A1 | 8/2008 | Howell et al. |
| 2008/0270468 A1* | 10/2008 | Mao et al. ................. 707/104.1 |
| 2009/0158185 A1* | 6/2009 | Lacevic et al. ............... 715/768 |
| 2011/0090254 A1 | 4/2011 | Carrino et al. |

OTHER PUBLICATIONS

Pozzi, F., and Small, C., Jun. 2002, "Vegetation and Population Density in Urban and Suburban Areas in the U.S.A.", Proceedings, 3rd International Symposium on Remote Sensing of Urban Areas, Istanbul, Turkey, edited by D. Makiav, C. Jörgens, F. Sunar-Erbek, and H. Akguen, Istanbul Technical University, pp. 489-496.*

Reibel, Michael, "Geographic Information Systems and Spatial Data Processing in Demography: a Review", Population Research and Policy Review, vol. 26(5-6), published online Sep. 6, 2007, pp. 601-618.*

Reibel, Michael, Agrawal, Aditya, "Areal interpolation of population counts using pre-classified land cover", Population Association of America, Annual Meeting in Los Angeles, Apr. 1, 2006, Population Research and Policy Review, vol. 26(5-6), pp. 619-633.*

Martin Reddy, Lee Iverson, and Yvan G. Leclerc, Feb. 2000, "Under the hood of GeoVRML 1.0", Proceedings of the fifth symposium on Virtual reality modeling language (Web3D-VRML), (VRML '00), ACM, New York, NY, USA, pp. 23-28.*

Rizzardi, M., Mohr, M. S., Merrill, D. W., and Selvin, S., "Interfacing U.S. census map files with statistical graphics software: application and use in epidemiology", Statistics in Medicine, vol. 12, copyright © 1993, pp. 1953-1964.*

Snyder, J.P., "Map Projections—A Working Manual", U.S. Geological Survey Professional Paper 1395, United States Government Printing Office, Washington, 1987, pp. 11-21 and 60-70.*

Australian Office Action received in Application serial No. 2010257305 dated Sep. 22, 2011 (1 page).

Australian Current Claims in Application serial No. 2010257305 dated Sep. 2011, 6 pages.

European Patent Office, "European Search Report", Application No. 10195798.3 dated May 17, 2011, 10 pages, Applicant: Palantir Technologies, Inc.

European Current Claims of Application No. 10195798.3, Applicant: Palantir Technologies, Inc., dated May 2011, 5 pages.

Ipbucker, C., "Inverse Transformation for Several Pseudo-cylindrical Map Projections Using Jacobian Matrix" XP019121334 dated Jun. 29, 2009, 12 pages.

Murray, C., Oracle Spatial Developer's Guide—6 Coordinate Systems (Spatial Reference Systems), XP002633543 downloaded from the Internet on Apr. 19, 2001 http://download.oracle.com/docs/cd/828359_01/appdev.111/b28400/sdo_cs_concepts.htm dated Jun. 2009, 61 pages.

Australian Office Action received in Application No. 2010227081, Applicant: Palantir Technologies, Inc., dated Mar. 18, 2011 (2 pages).

Current Claims of Australian Application No. 2010227081, Applicant: Plantir Technologies, Inc., dated Mar. 2011 (4 pages).

Australian Office Action received in Application No. 2010257305, Applicant: Plantir Technologies, Inc., dated Apr. 12, 2011 (3 pages).

Current Claims of Australian Application No. 2010257305 dated Apr. 2011 (6 pages).

* cited by examiner

500

| | | | | | | | |
|---|---|---|---|---|---|---|---|
| | | | | | | | |
| | 11 | 12 | 13 | 14 | 15 | | |
| | 10 | 2 | 3 | 4 | 16 | | |
| ... | 9 | 1 | Origin Cell | 5 | 17 | | |
| | 24 | 8 | 7 | 6 | 18 | | |
| | 23 | 22 | 21 | 20 | 19 | | |
| | | | | | | | |

FIG. 5

TECHNIQUES FOR DENSITY MAPPING

TECHNICAL FIELD

The invention is related to computer-based mapping, and more particularly to techniques in a data processor for density mapping.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2009 Palantir Technologies, Inc.

BACKGROUND

Computer-based geospatial applications typically allow a user to associate an event with a discrete geographic location on the surface of a planetary body such as the Earth. This process of associating events with geographic locations is commonly referred to as "geotagging". For example, a series of crime incidents may be each be associated with a geographic coordinate to indicate where the crime incidents occurred. As another example, the population count of a town may be associated with a geographic coordinate to indicate the population at a particular geographic location.

In addition to functionality for geotagging, geospatial applications may also include functionality for density mapping. Very generally, density mapping includes distributing a geotagged event over a geographic area and displaying a surface ("density surface") on a two-dimensional planar map to give a visual indication of the density of the geotagged event as distributed over the geographic area. For example, a geospatial application may generate a heat map to indicate a density of crime incidents in a city. The areas of conceptually hotter colors on the heat map represent areas of high event density (e.g., areas of higher incidences of criminal activity) while areas of conceptually cooler colors represent areas of lower event density (e.g., areas of lower incidences of criminal activity).

Various approaches may be used to display a density surface on a planar map. For example, according to a planar distance-based approach, distances in a two-dimensional planar coordinate system are used to determine how density is distributed over a geographic area displayed on the map. One problem with the planar distance-based approach is that it does not account for projection distortions in the map on which the density surface is displayed. Projection distortions result from "flattening" the curved surface of a planetary body into a plane to be displayed as a map. Projection distortions include distortions of one or more of shape, area, distance, and direction. Projection distortions are generally more pronounced over large geographic areas such as, for example, in maps of the whole Earth.

As an example of distortions caused by "flattening" a curved surface into a plane, a Mercator map projection, which is commonly used to create a map of the surface of the Earth, produces a map in which both area and distance are distorted with the greatest distortions near the North and South Poles. For example, in a Mercator map of the whole Earth, Greenland is presented as having roughly the same geographic surface area as the continent of Africa. However, in actuality, Africa's surface area is many times the size of Greenland's surface area.

With the planar distance-based approach, density surfaces are generated irrespective of the projection distortions of the map on which the density surfaces are displayed. For example, if there are two density surfaces, one near the North Pole and the other near the Equator, using the planar distance-based approach on a Mercator projected map would result in two identical appearing density surfaces (i.e., same area, shape, size, and falloff) being displayed on the map even though geographic areas near the North Pole would have greater projection distortions than the area near the Equator. Thus, the planar distance-based approach may produce a density surface with a significantly inaccurate representation of the geographic area covered by the density surface and a significantly inaccurate representation of density falloff over the covered geographic area.

As users of geospatial applications become more sophisticated, the need for greater accuracy in density mapping has increased. Consequently, there is a need to be able to more accurately present the geographic area covered by a density surface when the density surface is displayed on a map, especially when the density surface is displayed on a map that represents a large geographic area such as a map of the whole Earth. Similarly, there is a need to be able to more accurately represent density falloff over the covered geographic area.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE FIGURES

The file of this patent contains at least one drawing executed in color. Copies of this patent with color drawing(s) will be provided by the Patent and Trademark Office upon request and payment of the necessary fee.

FIG. 5 illustrates a map plane divided into cells.

DETAILED DESCRIPTION

In the following description, for the purposes of explanation, numerous specific details are set forth in order to provide a thorough understanding of the present invention. It will be apparent, however, that the invention may be practiced without these specific details. In other instances, well-known structures and devices are shown in block diagram form in order to avoid unnecessarily obscuring the invention.

Density Mapping System

Embodiments include a computer or system providing or implementing methods for displaying a density surface on a planar map on a computer data display device, to give a visual indication of density of a geotagged event distributed over a geographic area. In particular, the techniques described herein allow a geospatial application to draw a density surface on a map on a computer display device in a manner that more accurately accounts for projection distortions in the map. With the techniques described herein, a geospatial application can draw a density surface that more accurately portrays the geographic area covered by the density surface and more accurately portrays density falloff over the covered geographic area. A specific example of a computer or system capable of implementing the techniques described herein is illustrated in FIG. 1.

Figure 1:
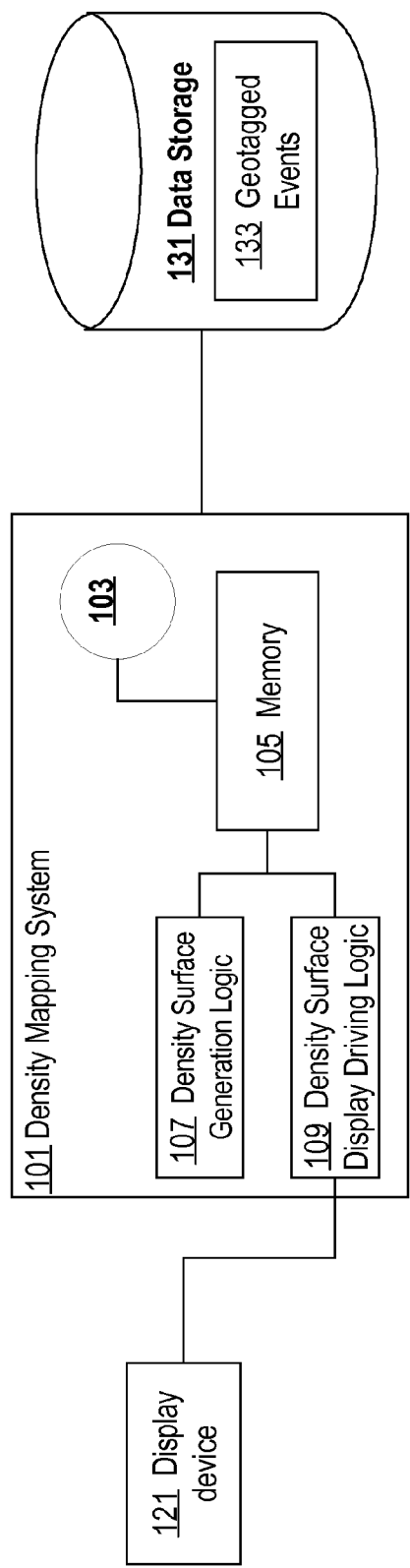
FIG. 1 is a block diagram of density mapping computer system.

Referring to FIG. 1, it illustrates a density mapping system 101 ("DMS") coupled to display device 121 and data storage 131. DMS 101 comprises one or more processors 103, memory 105, density surface generation logic 107, and density surface display driving logic 109. For the purpose of illustration, it shall be assumed that DMS 101 is a computer such as the computer system 600 of FIG. 6. Thus, density surface generation logic 107 and density surface display driving logic 109 may be implemented in a special-purpose computer or in other hardware or software or some combination thereof. When the term "system" is used in this disclosure, the term includes a special-purpose computer, or a general-purpose computer loaded with, hosting or executing one or more computer programs which when executed implement the techniques herein.

A density mapping request to DMS 101 may indicate a geotagged event for which a density surface is to be generated and displayed. As used herein, the term "geotagged event" broadly refers to an association between an event value and a geographic coordinate. The event value may be any numeric value associated with a discrete geographic location identified by a geographic coordinate. The meaning of an event value may vary depending on what the event value represents. For example, an event value may represent a number of persons residing in a town, a number of traffic accidents at an intersection, a number of crime incidents in a city, etc. In certain embodiments, an event value is treated as a numeric value associated with a particular geographic location through a geographic coordinate. Thus, embodiments are not limited to any particular type of event value and not limited by what event values represent.

The geographic coordinate of a geotagged event may be specified using virtually any geographic coordinate system suitable for identifying a discrete location on the surface of a planetary body. For example, a location on the surface of the Earth may be identified by a latitude and longitude pair according to a reference datum such as, for example, the World Geodetic System 1984 (WGS84) reference datum. As another example, a location on the surface of the Earth may be identified according to other geographic coordinate systems such as the Universal Transversal Mercator (UTM) coordinate system or the Military Grid Reference System (MGRS) coordinate system. Thus, specification of geographic coordinates is not limited to latitude and longitude pairs or any particular geographic coordinate system.

DMS 101 may maintain geotagged event data 133 that represents event values, geographic coordinates, and their associations in a computer-readable storage medium such as memory 105 or data storage 131. Geotagged event data 133 may be provided to DMS 101 in virtually any manner suitable for providing data to a computer system, such as by a user through a user interface such as, for example, a command line interface or a graphical user interface or by a computing process through a configuration file, a middleware messaging layer, a programmatic interface such as an Application Programming Interface (API), a remote procedure call, and the like.

Memory 105 is configured to store geotagged event data 133 representing one or more associations between one or more event values and one or more geographic coordinates. For example, DMS 101 may read geotagged event data 133 from data storage 131 and store geotagged event data 133 in memory 105 in response to a request to draw one or more density surfaces on a map. Data for displaying a map may also be stored in memory 105 as well as data storage 131. Such data may include aerial photographic imagery, satellite imagery, computer graphics, or other data suitable for creating a visual representation of the map on a computer display unit with the aid of display driving logic of DMS 101.

Density surface generation logic 107 is coupled to memory 105 and configured to transform a state of memory 105 by generating one or more density surfaces for one or more geotagged events to be displayed on a map. Techniques for generating a density surface are described in greater detail elsewhere in this document.

Density surface display driving logic 109 is coupled to memory 105 and configured to cause display on a display device, such as display device 102, a density surface generated by density surface generation logic 107. Techniques for causing display of a density surface on a display device are described in greater detail elsewhere in this document.

Computer display unit 121 may be virtually any computer monitor or display such as, for example, a Liquid Crystal Display (LCD) or Cathode Ray Tube (CRT). Display unit 121 may be a component of DMS 101. Alternatively, display unit 121 may be a component of a separate computer system (not shown) coupled to DMS 101 through a communication mechanism such as a data network. For example, display device 121 may be a component of a desktop computer system or a mobile computing device such as a cell-phone, a personal data assistant (PDA), or a Global Positioning Satellite (GPS) receiver communicatively coupled to DMS 101 through a data network such as the Internet, a wireless network, a Local Area Network (LAN), a Wide Area Network (WAN), and the like.

Density Surface

A density surface is a surface displayed on a map that represents density of an event value over a geographic area including fall-off of density over the area. According to one embodiment, the density surface is a heat map surface. A heat map surface represents density FIG. 2 is a screen shot from a computer display device illustrating a heat map containing two example heat map surfaces generated and displayed according to an embodiment.

Figure 2:
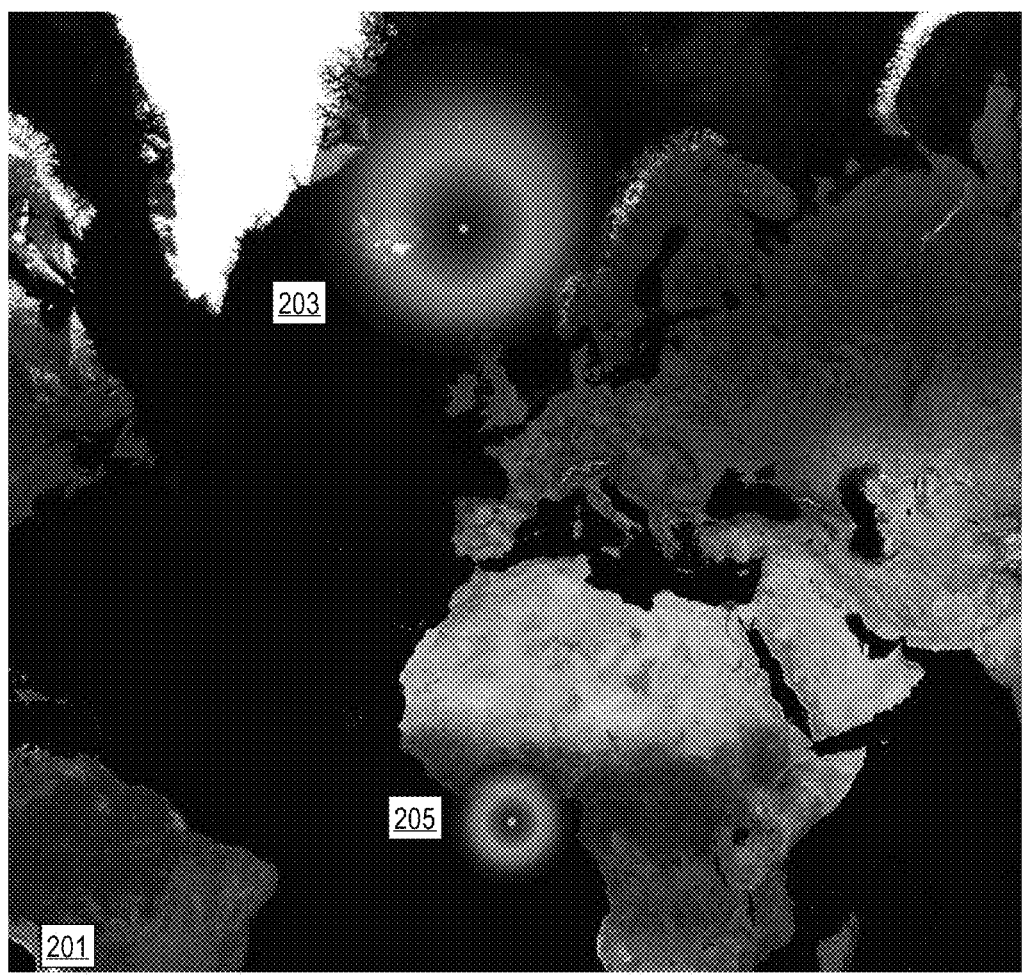
FIG. 2 is a screen shot of a heat map including two heat map surfaces displayed on a Mercator map.

Referring to FIG. 2, a map 201 includes two example heat map surfaces 203 and 205. For the purpose of explanation, it shall be assumed that heat map surfaces 203 and 205 are based on identical event values distributed identically over the same amount of geographic area. Map 201 is a Mercator map of a large portion of the surface of the Earth and having no projection distortions along the Equator and increasing projection distortions moving away from the Equator toward the Poles.

As shown in FIG. 2, each heat map surface 203 and 205 has a series of colored bands. The varying colors of the bands in a heat map surface represent a fall-off of density of the corresponding event value over the geographic area covered by the heat map surface. The fall-off of density over a geographic area may be calculated using a kernel density function as described in greater detail elsewhere in this document.

As shown in FIG. 2, heat map surface 203 has a different shape, size, and density fall-off than heat map surface 205 despite the two surfaces representing identical event values distributed identically over the same amount of geographic area. In particular, the overall shape of heat map surface 203 is bounded by complex curves that make it roughly "oval shaped" while the overall shape of heat map surface 205 is more circular. Similarly, each colored band representing fall-off of density in heat map surface 203 is a roughly "oval shaped" complex curve while each colored band of heat map surface 205 is closer to a circular ring. Thus, heat map surface 203, as generated and displayed according to an embodiment of the invention, accounts for the relatively severe projection distortions that occur in a Mercator map of a large portion of the surface of the Earth near the Poles such as in map 201 of FIG. 2.

Heat map surface 203 more accurately represents the geographic area over which the corresponding event value is distributed and more accurately represents the fall-off of density over the covered geographic area when compared to heat map surfaces generated using conventional density mapping approaches. For example, a conventional approach might generate and display a heat map surface that appears like heat map surface 205 in terms of size, shape, and density fall-off but at the position of heat map surface 203. Thus, such conventional approaches generate heat map surfaces that are not as visually accurate as the heat map surfaces generated according to embodiments.

Map Plane

Conceptually, a map plane is a two-dimensional plane into which some of or the entire curved surface of a planetary body is projected as a two-dimensional map. The portion of the curved surface of the planetary body that is projected as a map is referred to herein as the "mapped geographic surface area".

The boundaries of the map plane and a coordinate system for referencing points in the map plane are defined according to a map projection used to project the mapped geographic surface area as a map. Generally, a map projection is any mathematical formula for representing a mapped geographic surface area as a planar map. For example, the Mercator map projection function may be used to create map 201 of FIG. 2.

A map projection typically includes a mathematical formula for transforming a geographic coordinate that identifies a point on the surface of the mapped geographic surface area into a corresponding planar coordinate in the map plane. The planar coordinate identifies a point on the map that corresponds to the point on the surface of the mapped geographic surface area. This type of mathematical formula for transforming a geographic coordinate into a planar coordinate is referred to herein as a "forward map projection function".

A map projection also typically includes a mathematical formula for performing the reverse operation of transforming a planar coordinate in the map plane into the corresponding geographic coordinate. This type of mathematical formula for transforming a planar coordinate into a corresponding geographic coordinate is referred to herein as an "inverse map projection function".

While map projection examples described herein involve a Mercator map projection which is one type of map projection in the class of cylindrical map projections, embodiments are not limited to any particular map projection or class of map projections.

Kernel Density Function

A kernel density function is a distribution of density of a geotagged event as a function of distance from an origin point. For example, to reflect an uncertainty in the precise geographic location of a geotagged event, a kernel density function may be used to model a probability that the event occurred at locations surrounding an identified geographic location. According to one embodiment, a kernel density function is used that approximates a Gaussian distribution of density as a function of distance from the origin point. The kernel density function accepts as input a specified distance from the origin point and a fall-off distance from the origin point at which density is zero. Given these inputs, the kernel density function outputs a density factor corresponding to the specified distance from the origin point. The specified distance and the fall-off distance may be specified according to any unit for measuring distance such as miles, meters, feet, yards, etc.

According to one embodiment, the following kernel density function is used to calculate a density factor for a specified distance from an origin point (d) and a specified fall-off distance (R):

$$\text{Density factor Value} = \left(\frac{3}{\pi R^2}\right)^2 \left(1 - \left(\frac{d}{R}\right)^2\right)^2$$

where d is a specified distance from the origin point and R is a fall-off distance.

Figure 3:
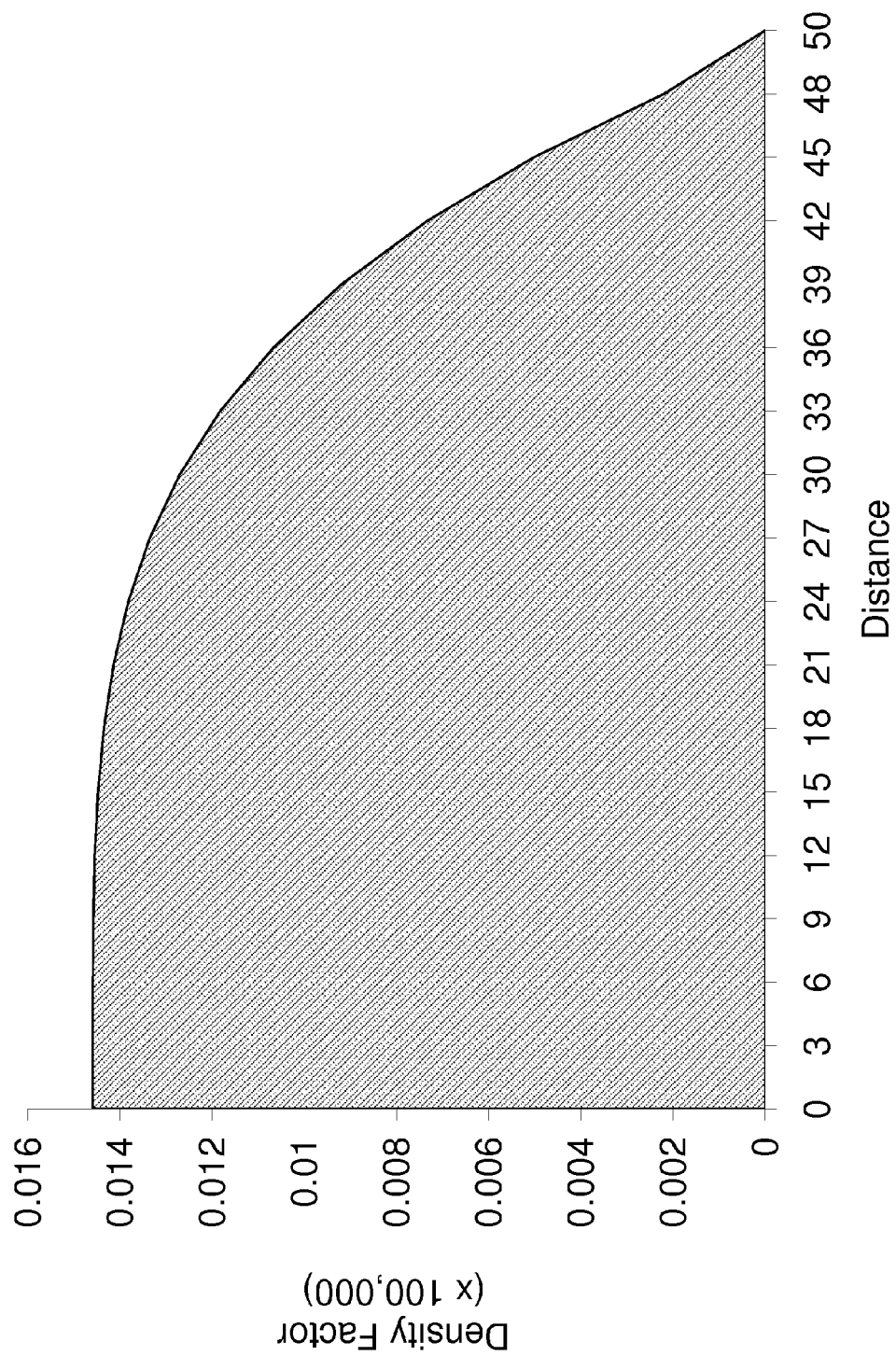
FIG. 3 is a graph of a density distribution according to an example kernel density function.

FIG. 3 is a graph showing a distribution of density as a function of distance along one dimension according to above example kernel density function. In the graph of FIG. 3, R is specified as 50 and a density factor is plotted for various distances d between 0 and 50. In the chart depicted in FIG. 3, plotted density factor values have been multiplied by 100,000 to improve the readability of the chart.

While embodiments may use the above-example kernel density function, embodiments are not limited to any particular kernel density function and any function that models a distribution of density as a function of distance may be used in alternative embodiments.

Generating and Displaying a Density Surface

Figure 4:
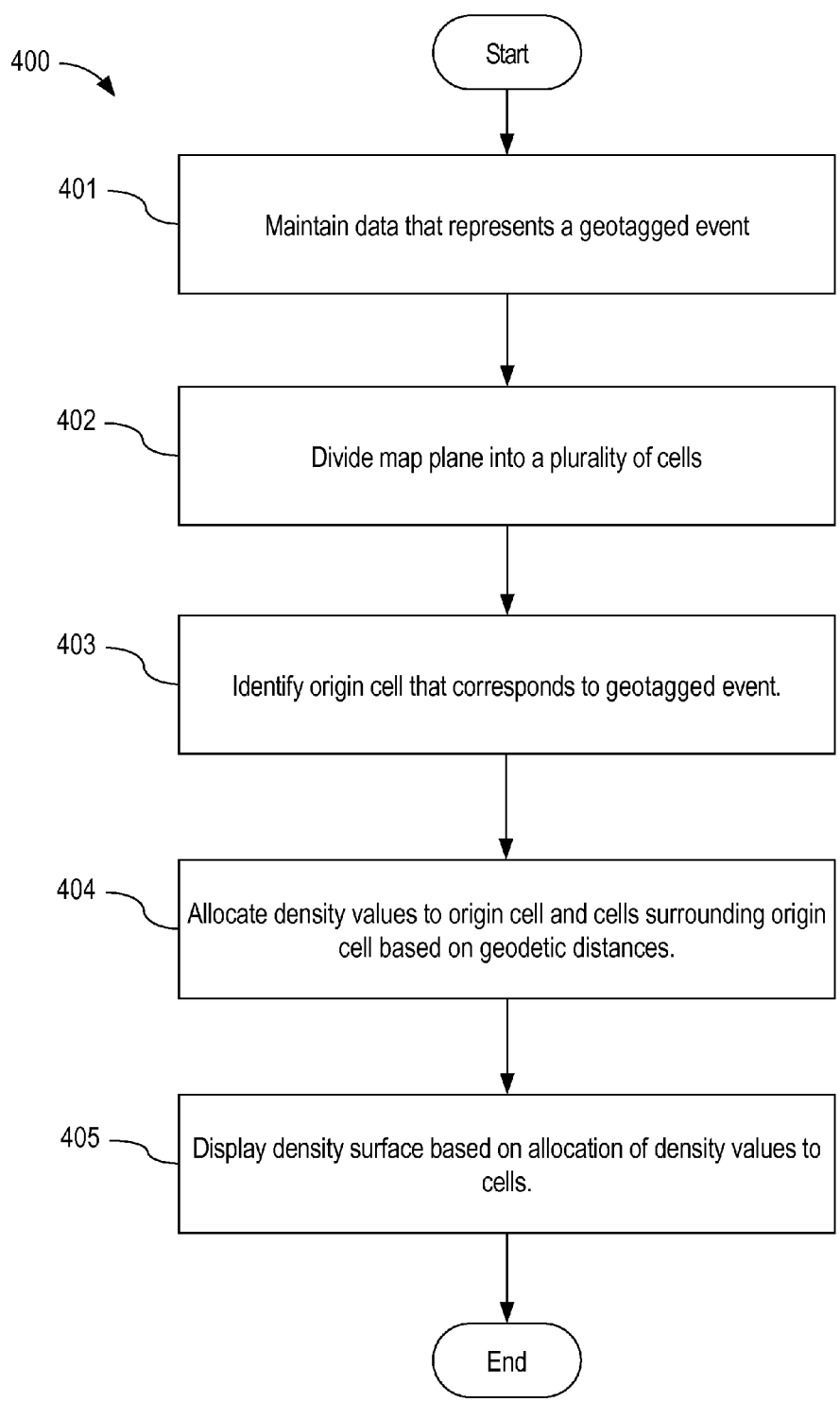
FIG. 4 is a flowchart for generating and displaying a density surface.

FIG. 4 illustrates an example of generating and displaying a density surface. Method and processes described herein are primarily described with reference to flowcharts. Each block within the flowcharts represents both a method step and an element of an apparatus for performing the method step. For example, in an apparatus implementation, a block within a flowchart may represent computer program instructions loaded into memory or storage of a general-purpose or special-purpose computer. Depending upon the implementation, the corresponding apparatus element may be configured in hardware, software, firmware, or combinations thereof.

At step 401, data is maintained that represents a geotagged event. The data may include an event value and an associated geographic coordinate. The geographic coordinate associated with the event value as part of the geotagged event is referred to herein as the "origin geographic coordinate". In an embodiment, step 401 involves storing geotagged events 133 in data storage 131 coupled to a computer system.

At step 402, a map plane is divided into a plurality of cells. In one embodiment, each cell is uniformly sized. Generally, the greater number of cells the map plane is divided into increases the representational accuracy of a density surface generated based on the cells at the expense of computational efficiency in generating the density surface. Conversely, the fewer number of cells the map plane is divided into decreases the representational accuracy of a density surface generated based on the cells, but the density surface can be generated more efficiently in terms of number of computations required to generate the density surface. In an embodiment, step 402 involves performing computer operations on data stored in memory 105 and representing the map plane and the cells. For example, data representing the map plane and the cells may be marked, tagged or associated with other data values to result in the dividing.

According to one embodiment, the size or number of cells may be tied to a user configurable parameter. For example, in a request to generate and display a density surface, the request may specify a cell size or some other parameter that is used to calculate cell size.

At step 403, one of the cells is identified based on the geotagged coordinate. This identified cell is referred to herein as the "origin cell". In one embodiment, the origin cell is identified by transforming the origin geographic coordinate into a planar coordinate in the map plane using a forward map projection function and then determining which cell that planar coordinate is contained within. Identifying in step 403 may involve the density surface generation logic 107 reading memory 105 and performing comparison operations and transformation operations.

Once the origin cell is identified, density values are allocated to the origin cell and cells surrounding the origin cell at step 404. According to one embodiment, cells surrounding the origin cell are visited according to a spiral-out pattern and density values are allocated to each visited cell based on providing a geodetic distance between each visited cell and the origin cell to a kernel density function. The geodetic distance between a visited cell and the origin cell is measured along the surface of a reference ellipsoid used to model the curved surface of a planetary body. In one embodiment, the reference ellipsoid is a sphere and the geodetic distance between a visited cell and the origin cell is measured along an arc of a great circle connecting two points on the surface of the reference sphere identified by geographic coordinates. In an embodiment, density surface generation logic 107 performs the allocation by reading memory 105 and performing reading, comparison, decision and writing operations.

By allocating density values to cells surrounding the origin cell based on geodetic distances, instead of planar distances, a density surface can be generated based on the cell allocations that more accurately accounts for projection distortions in the area of the map on which the density surface will be displayed. In contrast, an approach that allocates density values to cells based on planar distances may not accurately reflect the true geodetic distance between cells.

According to one embodiment, the density value allocated to a target cell is calculated by multiplying the event value for which a density surface is being generated by a density factor for the target cell. As mentioned above, the density factor for a target cell is obtained by providing a geodetic distance between a geographic coordinate that corresponds to the target cell and a geographic coordinate that corresponds to the origin cell to the kernel density function.

In one embodiment, the geographic coordinate that corresponds to the target cell is identified by determining the planar coordinate in the map plane that corresponds to the center of the target cell. This planar coordinate is then transformed into a geographic coordinate using an inverse map projection function.

In one embodiment, the geographic coordinate that corresponds to the origin cell is the origin geographic coordinate. In another embodiment, the geographic coordinate that corresponds to the origin cell is identified by determining the planar coordinate in the map plane that corresponds to the center of the origin cell. This planar coordinate is then transformed into a geographic coordinate using an inverse map projection function.

Once a geographic coordinate corresponding to the target cell and a geographic coordinate corresponding to the origin cell have been identified, a geodetic distance between the two geographic coordinates is calculated. As mentioned above, according to one embodiment, a geodetic distance between the two geographic coordinates is calculated as the shortest distance along the curved surface of a reference ellipsoid used to model a planetary body. For example, if the two geographic coordinates identify locations on the surface of the Earth, a geodetic distance between the two geographic coordinates may be calculated as the shortest great-circle distance between the two geographic coordinates along the surface of a reference sphere that models the surface of the Earth.

Once a geodetic distance between a geographic coordinate corresponding to the target cell and a geographic coordinate corresponding to the origin cell has been calculated, the geodetic distance is provided as input to a kernel density function. The kernel density function provides as output, a density factor as a function of the inputted geodetic distance. The event value of the geotagged event for which a density surface is being generated is then multiplied by the outputted density factor and the result is allocated to the target cell.

This process of allocating density values to target cells based on geodetic distances is performed for the origin cell and cells surrounding the origin cell. According to one embodiment, cells surrounding the origin cell are visited in spiral-out pattern until threshold criteria is met. FIG. 5 illustrates cells 500 of a map plane.

In FIG. 5, an origin cell has been identified, for example, according to the process of step 403 described above. The origin cell is set as the target cell and a density value is allocated to the target cell. In the case where the origin cell is the target cell, the geodetic distance provided as input to the kernel density function may be zero.

According to one embodiment, cells surrounding the origin cell are visited in a spiral-out pattern and density values are allocated to each visited cell. For example, cells 500 include numbered cells surrounding the origin cell. The number in each cell indicates the order of visitation of the numbered cells according to an embodiment. In the embodiment depicted in FIG. 5, the spiral-out pattern proceeds clockwise around the origin cell. However, in another embodiment the spiral-out pattern proceeds counterclockwise. Further, the order of visitation of cells surrounding the origin cell is not limited to a spiral-out pattern and other visitation patterns may be used. Thus, the spiral-out visitation patterns described herein are but some of the many possible visitation patterns that may be used.

As mentioned above, as cells surrounding the origin cell are visited according to a visitation pattern, a density value is allocated to each visited cell. Density values are allocated to surrounding cells according to the visitation pattern until a threshold criterion is met. In one embodiment, the threshold criterion is met when the density value to be allocated to a visited cell is zero or falls below a specified threshold value. In another embodiment, the threshold criterion is met when the density values allocated to a threshold number of consecutively visited cells are each zero or each fall below a specified threshold value.

At step 405, once density values have been allocated to the origin cell and cells surrounding the origin cell, a density surface is caused to be displayed on a display device based on the density value allocations. For example, a heat map surface can be displayed in which ranges of density values allocated to cells are assigned to different colors.

Each cell corresponds to a certain number of pixels of the display device. For example, each cell may correspond to an area of 16 square pixels of the display device. The number of pixels that correspond to a cell may vary depending on variety of factors including the number of cells into which the map plane was divided into at step 402. Each group of pixels corresponding to a cell is then colored according to the range into which the density value allocated to the cell falls into.

As described previously with respect to FIG. 2, a density surface generated according to the approaches described herein may be displayed on a map that accounts for the projections distortions in the area of the map on which the density surface is displayed. Displaying may involve density surface display driving logic 109 reading values from memory 105, rendering a display using display memory and rendering logic or hardware, and driving display device 121 with pixel values or other data sufficient to cause the display device to display a heat map as described.

Overlapping Density Surfaces

In some cases, the origin geographic coordinates and fall-off distances of two or more density surfaces may be such that the surfaces overlap. In such a case, multiple density values may be allocated to the same cell, one density value for each of the density surfaces that overlap the cell. According to one embodiment, the density value allocated to a cell that multiple density surfaces overlap is a mathematical combination of the individual density values allocated to the cell. For example, the density value allocated to a cell may be the sum of the individual density values allocated to the cell.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
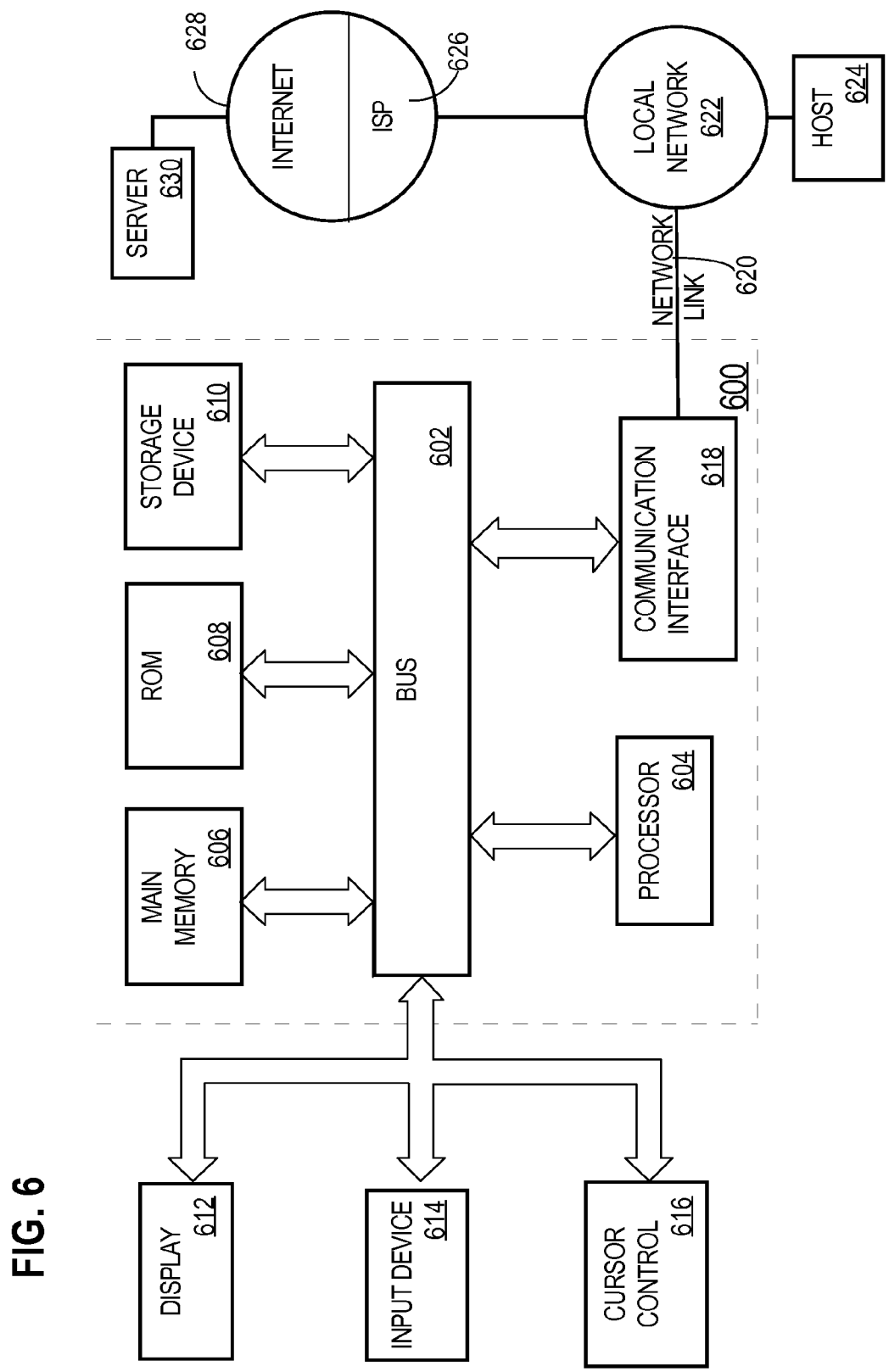
FIG. 6 is a block diagram illustrating a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Extensions and Alternatives

In the foregoing specification, embodiments of the invention have been described with reference to numerous specific details that may vary from implementation to implementation. For example, certain embodiments have been described with respect to geo tagging locations on the Earth, but other embodiments may be applied to geo tagging other kinds of locations or other planetary bodies. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for displaying a density surface on a map, the method comprising:
    maintaining data that represents an association between a value and a first geographic coordinate;
    dividing a map plane into a plurality of cells;
    identifying a first cell of said plurality of cells based at least in part on said first geographic coordinate;
    for at least one cell of said plurality of cells in proximity to said first cell,
        determining a first planar coordinate in said map plane that corresponds to the at least one cell,
        transforming said first planar coordinate into a second geographic coordinate,
        computing a geodetic distance between said second geographic coordinate and a geographic coordinate corresponding to said first cell,
        determining a density value to be allocated to the at least one cell based at least in part on said geodetic distance, and
        allocating the density value to the at least one cell;
    causing a density surface to be displayed on a map based at least in part on the density value allocated to the at least one cell; and
    wherein the method is performed by one or more computing devices.

2. The method of claim 1, wherein identifying the first cell of said plurality of cells based on said first geographic coordinate comprises:
    transforming said first geographic coordinate into a second planar coordinate in said map plane; and
    identifying, as the first cell, a cell of said plurality of cells that contains said second planar coordinate.

3. The method of claim 2, wherein the second planar coordinate corresponds to a center of said first cell.

4. The method of claim 1, wherein said geographic coordinate corresponding to said first cell is the first geographic coordinate.

5. The method of claim 1, wherein said first planar coordinate corresponds to a center of the at least one cell.

6. The method of claim 1, wherein transforming said first planar coordinate into the second geographic coordinate comprises transforming said first planar coordinate into the second geographic coordinate using an inverse map projection function.

7. The method of claim 1, wherein allocating the density value to the at least one cell comprises adding the density value to another density value previously allocated to the at least one cell.

8. The method of claim 1, wherein computing the geodetic distance between the second geographic coordinate and the geographic coordinate corresponding to the first cell comprises computing a great circle distance between the second geographic coordinate and the geographic coordinate corresponding to the first cell.

9. A non-transitory computer-readable medium storing instructions which, when executed by one or more processors, cause the one or more processors to perform:
    maintaining data that represents an association between a value and a first geographic coordinate;
    dividing a map plane into a plurality of cells;
    identifying a first cell of said plurality of cells based at least in part on said first geographic coordinate;
    for at least one cell of said plurality of cells in proximity to said first cell,
        determining a first planar coordinate in said map plane that corresponds to the at least one cell,
        transforming said first planar coordinate into a second geographic coordinate,
        computing a geodetic distance between said second geographic coordinate and a geographic coordinate corresponding to said first cell,
        determining a density value to be allocated to the at least one cell based at least in part on said geodetic distance, and allocating the density value to the at least one cell; and
causing a density surface to be displayed on a map based at least in part on the density value allocated to the at least one cell.

10. The non-transitory computer-readable medium of claim 9, wherein identifying the first cell of said plurality of cells based on said first geographic coordinate comprises:
transforming said first geographic coordinate into a second planar coordinate in said map plane; and
identifying, as the first cell, a cell of said plurality of cells that contains said second planar coordinate.

11. The non-transitory computer-readable medium of claim 10, wherein the second planar coordinate corresponds to a center of said first cell.

12. The non-transitory computer-readable medium of claim 9, wherein said geographic coordinate corresponding to said first cell is the first geographic coordinate.

13. The non-transitory computer-readable medium of claim 9, wherein said first planar coordinate corresponds to a center of the at least one cell.

14. The non-transitory computer-readable medium of claim 9, wherein transforming said first planar coordinate into the second geographic coordinate comprises transforming said first planar coordinate into the second geographic coordinate using an inverse map projection function.

15. The non-transitory computer-readable medium of claim 9, wherein allocating the density value to the at least one cell comprises adding the density value to another density value previously allocated to the at least one cell.

16. The non-transitory computer-readable medium of claim 9, wherein computing the geodetic distance between the second geographic coordinate and the geographic coordinate corresponding to the first cell comprises computing a great circle distance between the second geographic coordinate and the geographic coordinate corresponding to the first cell.

17. A computer system comprising:
a processor;
a memory;
density surface generation logic; and
density surface display driving logic;
the memory configured to maintain data that represents an association between a value and a first geographic coordinate;
the density surface generation logic coupled to said memory and configured to transform a state of said memory by:
dividing a map plane into a plurality of cells;
identifying a first cell of said plurality of cells based at least in part on said first geographic coordinate;
for at least one cell of said plurality of cells in proximity to said first cell,
determining a first planar coordinate in said map plane that corresponds to the at least one cell,
transforming said first planar coordinate into a second geographic coordinate,
computing a geodetic distance between said second geographic coordinate and a geographic coordinate corresponding to said first cell,
determining a density value to be allocated to the at least one cell based at least in part on said geodetic distance,
allocating the density value to the at least one cell; and
the density surface display driving logic coupled to said memory and configured to cause, based at least in part on the density value allocated to the at least one cell, display of a density surface on a map on a computer display device.

18. The computer system of claim 17, wherein identifying the first cell of said plurality of cells based on said first geographic coordinate comprises:
transforming said first geographic coordinate into a second planar coordinate in said map plane; and
identifying, as the first cell, a cell of said plurality of cells that contains said second planar coordinate.

19. The computer system of claim 18, wherein the second planar coordinate corresponds to a center of said first cell.

20. The computer system of claim 17, wherein said geographic coordinate corresponding to said first cell is the first geographic coordinate.

21. The computer system of claim 17, wherein said first planar coordinate corresponds to a center of the at least one cell.

22. The computer system of claim 17, wherein transforming said first planar coordinate into the second geographic coordinate comprises transforming said first planar coordinate into the second geographic coordinate using an inverse map projection function.

23. The computer system of claim 17, wherein allocating the density value to the at least one cell comprises adding the density value to another density value previously allocated to the at least one cell.

24. The computer system of claim 17, wherein computing the geodetic distance between the second geographic coordinate and the geographic coordinate corresponding to the first cell comprises computing a great circle distance between the second geographic coordinate and the geographic coordinate corresponding to the first cell.

25. A method comprising:
maintaining data that represents an association between a value and a first geographic coordinate;
dividing a map plane into a first plurality of cells;
identifying a first cell of said first plurality of cells based on said first geographic coordinate;
allocating density values to a second plurality of cells of said first plurality of cells that surround said first cell based on geodetic distances between geographic coordinates that correspond to said second plurality of cells and a geographic coordinate that corresponds to said first cell; and
causing a density surface to be displayed on a map based on the density values allocated to the second plurality of cells
wherein the method is performed by one or more computing devices.

26. A method for displaying a density surface on a map, the method comprising:
for each of a plurality of cells of a map plane in proximity to a first cell of the map plane:
computing a geodetic distance between a geographic coordinate corresponding to the each cell and a geographic coordinate corresponding to said first cell,
determining a density value to be allocated to the each cell based at least in part on said geodetic distance, and
allocating the density value to the each cell;
causing a density surface to be displayed on a map based at least in part on the density values allocated to the plurality of cells;
wherein the method is performed by one or more computing devices.

27. The method of claim 26, further comprising:
   maintaining data that represents an association between an event value and the geographic coordinate corresponding to said first cell; and
   identifying the first cell in the map plane based at least in part on said geographic coordinate corresponding to said first cell.

28. The method of claim 26, wherein determining the density value to be allocated to the each cell is based at least in part on said geodetic distance and a kernel density function; and wherein the kernel density function represents a distribution of density as a function of distance from an origin point.

29. The method of claim 28, wherein determining the density value to be allocated to the each cell includes:
   in response to inputting said geodetic distance to the kernel density function, obtaining a density factor value as output from the kernel density function; and
   determining the density value to be allocated to the each cell by multiplying the density factor value and an event value.

* * * * *